United States Patent [19]

Adler

[11] 3,739,299

[45] June 12, 1973

[54] ADJUSTABLE PIEZOELECTRIC TUNABLE OSCILLATOR FOR ACOUSTIC SIGNAL GENERATING SYSTEM

[75] Inventor: Robert Adler, Northfield, Ill.

[73] Assignee: Zenith Radio Corporation, Chicago, Ill.

[22] Filed: Apr. 20, 1972

[21] Appl. No.: 246,047

[52] U.S. Cl. ....... 331/116 R, 178/DIG. 15, 310/8.1, 310/8.2, 331/163, 331/179, 340/15, 340/147 C, 343/225

[51] Int. Cl. ........................ H03b 5/36, H04b 11/00

[58] Field of Search ............... 331/116 R, 155, 163, 331/179; 178/DIG. 15; 325/391, 392; 310/8.1, 8.2; 340/15, 147 B, 147 C; 343/225; 116/137 A

[56] References Cited

UNITED STATES PATENTS

| | | | |
|---|---|---|---|
| 3,100,886 | 8/1963 | Marks | 331/116 R X |
| 3,183,509 | 5/1965 | Ellett | 116/137 A X |
| 3,235,817 | 2/1966 | Stapelfeldt | 331/116 R X |

*Primary Examiner*—Roy Lake
*Assistant Examiner*—Siegfried H. Grimm
*Attorney*—John H. Coult et al.

[57] ABSTRACT

An acoustic signal transmitter includes an electronic oscillator capable of developing a signal of a given acoustic frequency within a range of such frequencies. A piezoelectric transducer forms part of the tuned circuit that controls the frequency of the oscillator. Coupled across the transducer is an electrical reactance selectively adjustable in discrete steps in order to modify the aforesaid frequency.

14 Claims, 4 Drawing Figures

ADJUSTABLE PIEZOELECTRIC TUNABLE OSCILLATOR FOR ACOUSTIC SIGNAL GENERATING SYSTEM

BACKGROUND OF THE INVENTION

The present invention pertains to an acoustic signal generating system. More particularly, it relates to acoustic transmitters capable of remotely controlling a plurality of events.

The desirability of being able to control remotely one or more selective functions of a television receiver was first recognized many years ago. One of the earliest approaches involved the use of connecting wires run between the television receiver and a small control console that might be located, for example, on a table adjacent to the chair in which the viewer was seated. A subsequent system involved the use of a hand-held source of light which the user beamed to a photocell mounted in the receiver cabinet. By employing a plurality of photocells disposed at different locations around the front of the cabinet, the user was able selectively to control any one of several different functions such as on-off, channel tuning, muting of the audio and volume.

With still more refinement, subsequent systems have employed radio-frequency signals developed by one or more oscillators, with the signals individually being at respective different frequencies or all of one frequency but individually being modulated at different audio frequencies. Frequency-selective circuitry within the receiver permit any one signal or its information to be routed so as to perform its assigned control function.

Probably the most successful remote-control approach has been that of using a small hand-held transmitter capable of producing a plurality of acoustic signals individually of respective different frequencies and in response to the depression of respective different push buttons. At the television receiver, the several different acoustic signals are picked up by a broad-band transducer and fed to selective circuitry for discrimination and ultimate response of the function desired. One particularly attractive acoustic transmitter employs a plurality of rods which develop the acoustic waves when struck on one end by action of a corresponding push button; no battery or other source of electrical power is required. However, with the development of color television and the expending desire of being able to control remotely more and more different functions at the television receiver, the size, complexity and expense of this kind of acoustic transmitter are posing formidable problems.

Yet, the use of acoustic frequencies continues to be attractive to this particular environment. Of course, they offer a firt advantage inthat they do not ordinarily penetrate into adjacen rooms where other television receiver might be present. Accordingly, still differen systems have been suggested in order to be able to continue utilizing acoustic frequencies while at the same time increasing the number of differen control functions that may be performed. One such increaed-function transmitter employs an oscillator the frequency of which can be set to any of, say, ten predeterminedvalues by means of push buttons. The oscillator is followed by a broad-band power amplifierwhich works into a broad-band acoustic transducer of reasonably high efficiency. Because the input impedance of the tuned acoustic transducer is a somewhat complex function of frequency, it is necessary to include the power amplifier as a buffer so as to decouple the transducer from the oscillator. Another approach has been to use an electrostatic transducer which is nearly aperiodic. The transducer impedance is thus a simple function of frequency as a result of which, with certain precautions, the transducer can directly be made a part of the frequency-determining circuit of the oscillator. While this avoids the need for a buffer amplifier, an undesired degree of frequency instability exists because of changes in the capacitance of the electrostatic transducer. In turn, this means that the control frequencies usually must be moved farther apart, putting additional requirements upon the receiver in order to be able to handle the greater spread of frequency range. Moreover, the aperiodic transducer is not very efficient, and more electrical power is needed than would be desirable.

It is, accordingly, a general object of the present invention to provide a new and improved acoustic signal generating system that includes at least some of the best features present in the aforedescribed prior transmitters while at the same time avoiding the undesirable features therein.

Another object of the present invention is to provide a new and improved acoustic transmitter which affords a wide choice in the selection of its particular individual components and stages.

A specific object of the present invention is to provide a new and improved acoustic transmitter which requires only simple electronic circuitry in a somewhat minimum amount and yet which is capable of providing a large number of individually different control frequencies each exhibiting a high degree of stability.

Another specific object of the present invention is to provide a new and improved multiple-frequency acoustic transmitter capable of operating at a high efficiency throughout a wide range of frequencies.

BRIEF DESCRIPTION OF THE DRAWINGS

The features of the present invention whice are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

DESCRIPTION OF THE PREFERRED EMBODIMENTS

Figure 1:
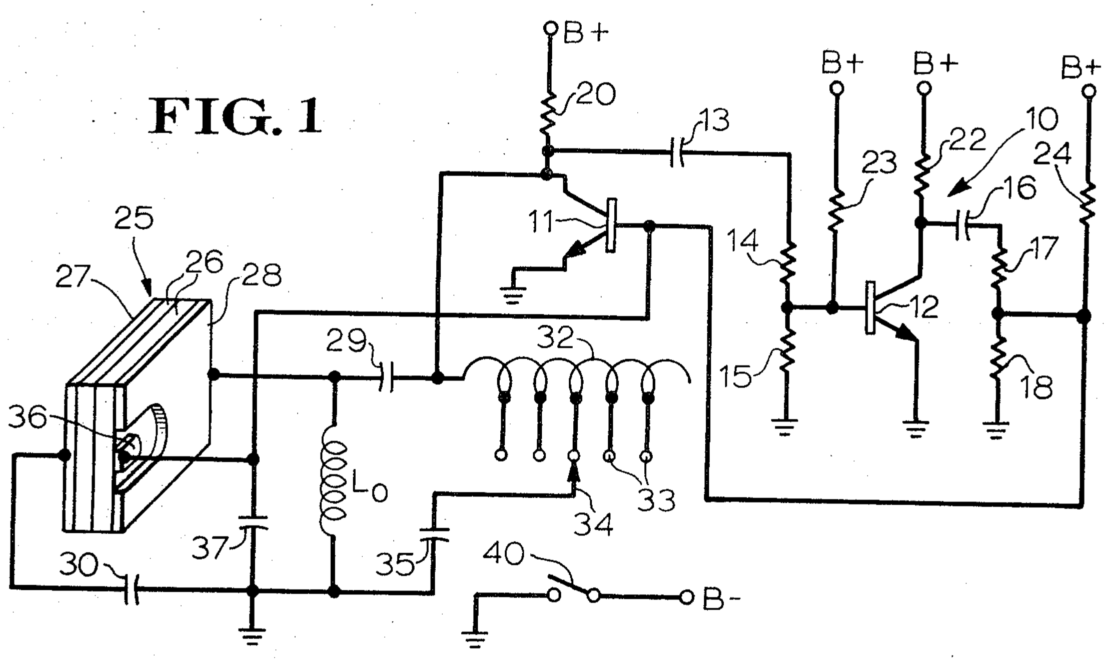
FIG. 1 generally is a schematic diagram of one embodiment of an acoustic wave transmitter.

The acoustic signal generating system of FIG. 1 includes an electronic oscillator 10, in this case of a two-stage variety, having as active elements a first NPN transistor 11 and a second NPN transistor 12. The collector of transistor 11 is coupled through a capacitor 13 and through a resistor 14 to the base of transistor 12. A resistor 15 is connected between the base of transistor 12 and ground. The collector of transistor 12 is coupled in a regenerative feedback path back to the base of transistor 11 through a capacitor 16 and through a resistor 17, the end of the latter connected to the base of transistor 11 also being returned to ground through a resistor 18. The emitters of both transistors 11 and 12 are returned to ground. The collector of transistor 11 is connected to a source of operating potential B+ through a resistor 20. Similarly, the collector of transistor 12 is connected to B+ through a resistor 22. Both transistors are forward biased by means of a resistor 23 connected between the base of transistor 12 and B+ and a resistor 24 connected between the base of transistor 11 and B+.

Coupled to oscillator 10 for the purpose of controlling its frequency of signal generation is a piezoelectric transducer 25. Transducer 25 includes a pair of piezoelectric slabs 26 cemented together and sandwiched between conductive electrodes 27 and 28. This structure constitutes a well-known resonator which may be excited into flexural vibrations by electrical excitation, such vibrations being rather efficiently coupled to the sourrounding air. Electrode 28 is coupled to the collector of transistor 11 through a capacitor 29. Electrode 27 is coupled to ground through a blocking capacitor 30, and a tuning inductor $L_o$ is effectively coupled between electrodes 27 and 28 by being connected between the latter and ground. One end of an inductor 32 is connected to the junction between capacitor 29 and the collector of transistor 11. The different turns of inductor 32 individually are connected to a respective plurality of taps 33, and a switch 34 is selectively adjustable to return any one selected tap to ground through a blocking capacitor 35.

A minor portion of electrode 28 is cut away near one edge of slab 26 so as to permit affixation to the thus-exposed surface of slab 26 of a small isolated electrode 36. Electrode 36 is connected directly to the base of transistor 11 and also is returned to ground through a capacitor 37.

In operation, transducer 25 is mechanically resonant at an acoustic frequency such as 40 kHz. When excited into resonant vibration, it propagates acoustic waves into space away from its vibratory surfaces. At the same time, transducer 25 serves as the primary frequency-determining element in oscillator 10 as a result of being coupled between the collector and emitter of transistor 11. Transistor 11 drives transistor 12, and the signal from the output of the latter, derived from the voltage divider composed of resistor 17 and 18, is fed regeneratively back to transistor 11 so that the system oscillates at the frequency determined primarily by transducer 25. Capacitor 29 and inductor 32 are connected in series with one another and that series combination is effectively coupled across electrodes 27 and 28 of the transducer. By changing the moveable contact of switch 34 from one of taps 33 to another, the mechanical vibration frequency of transducer 25 is changed.

This, in turn, results in a corresponding alteration of the frequency of the acoustic signal generated by oscillator 10. Thus, the user may change the frequency of the acoustic signals transmitted into space by transducer 25 in discrete steps merely by manipulating switch 34 so as to select between different ones of taps 33. In this manner, for example, a different function in a remote-located device such as a television receiver may be effected upon successive different energizations of the system of FIG. 1. The overall system is energized whenever a switch 40, in this case completing the return of the B− power source terminal to ground, is closed.

A leading attribute of the disclosed arrangement is that it takes advantage of the high coupling coefficient of the electromechanical transducer in order to permit a variation in an electrical reactance to be used to adjust the mechanical resonant frequency of the transducer so that the latter constitutes a high Q mechanical vibrator throughout the desired frequency range. To appreciate this capability more fully, it may be helpful to review cerain background.

As indicated in the introduction, broad band transducers have been driven by broad band amplifiers, in turn driven by multi-frequency oscillators, in order to provide multiple-channel control. Such an approach tends to be complicated and is not very efficient. On the other hand, a narrow band transducer that exhibits a high mechanical Q is very efficient when driven at its own resonant frequency. The narrow band transducer is easily driven at its own frequency when it is employed to control the frequency of its driving oscillator. Thus, a tuned reed has been used to control a feedback circuit which supplies the power to maintain the reed in mechanical oscillation. Well known examples are the pendulum clock and the tuning fork oscillator used in wristwatches.

Both the pendulum and the tuning fork exhibit a high Q. At the same time however, they have a very low mechanical or electromechanical coupling coefficient with respect to the driving mechanism or circuit. By reason of the low coupling, they may be driven only at a frequency very close to their mechanical resonant frequency. Thus, they are useful only in an environment calling for a single frequency standard.

Piezoelectric transducers, and particularly those composed of a ferroelectric material such as PZT, are characterized by a high degree of coupling between their electrical and mechanical properties. As a consequence, the mechanical resonant frequency of such a vibrator may be modified by changing its electrical termination. A known example of this is the change which occurs in the mechanical resonant frequency of a quartz crystal when its termination is switched from an open circuit to a closed circuit. It should be noted in passing, however, that the quartz crystal is not a material that exhibits a particularly high coupling coefficient.

In the present case, the transducer is selected for its properties of being a high Q mechanical vibrator with a high electromechanical coupling coefficient. It is the frequency determining element in the oscillator so that it can efficiently radiate the energy supplied by the battery or other power source. The external electrical reactance, which is adjustable in steps, is added in a manner such that, because of the tight coupling between the electrical and mechanical properties, a variation in the electrical reactance modifies the mechanical resonant frequency of the vibrator. Consequently, no matter how the adjustable reactance is changed, the mechanical vibrator is always driven at its mechanical resonant frequency (as modified by the electrical terminaion). In any tuning condition, therefore, transducer 25 continues to function as a narrow band, high Q mechanical vibrator. It thus is capable, throughout the frequency range, of efficiently converting electrical energy into mechanical energy and the latter into acoustic energy.

Figure 2:
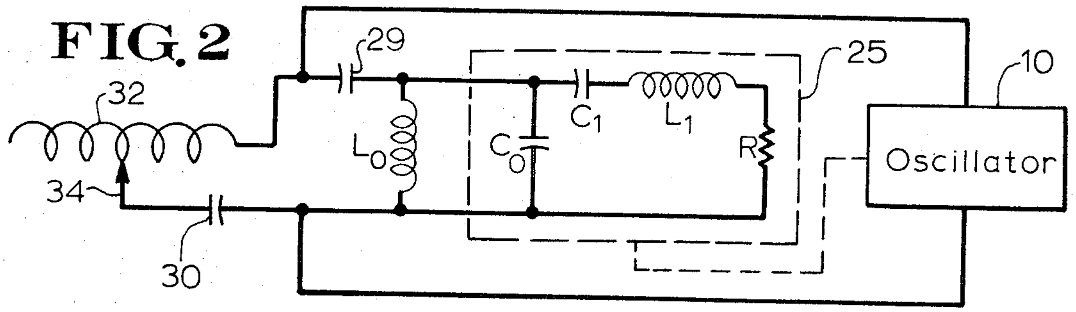
FIG. 2 is an equivalent circuit of the transmitter of FIG. 1.

Turning now to electrical details, FIG. 2 depicts the equivalent circuit of the arrangement of FIG. 1. Thus, transducer 25 is represented by its well-known equivalent elements of a capacitor $C_o$ shunted across its energizing electrodes together with a capacitor $C_1$, an inductor $L_1$ and a resistor R connected in series between the electrodes. Capacitor $C_o$ represents the capacitance present between electrodes 27 and 28, capacitor $C_1$ represents the compliance of slab 26 in the completed transducer, inductor $L_1$ represents the mass of the vibratory structure and resistor R represents the mechanical damping of the device.

Figure 3:
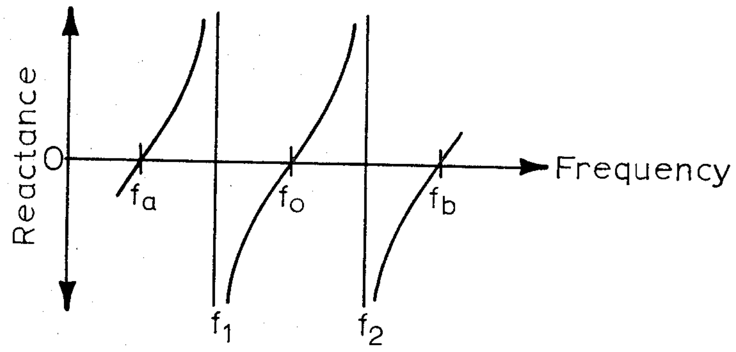
FIG. 3 is a plot of the reactance characteristic of apparatus depicted in FIGS. 1 and 2.

In a manner known, as such, external inductance $L_o$ is coupled between the transducer electrodes so as to tune with equivalent capacitor $C_o$ and obtain a resulting transducer input reactance characteristic characterized as exhibiting a zero-value center frequency between a pair of pole frequencies. A similar, though somewhat different as yet to be described, reactance characteristic is shown in FIG. 3. Thus, the reactance plot reveals a zero-value center frequency $f_o$ above a first pole frequency $f_1$ and below a second pole frequency $f_2$. It may be shown that the frequency-spacing between poles $f_1$ and $f_2$ is equal to the center frequency $f_o$ multiplied by the electromechanical coupling factor $k$.

Returning to FIG. 2, the addition of the selectively adjustable reactance composed of capacitor 29 and inductor 32 permits the zero-reactance point $f_o$ to be shifted in frequency. In principle, any frequency between poles $f_1$ and $f_2$ can so be reached. In practice, only about half of that frequency range is available. Preferably, capacitor 29 is assigned a value so as to tune the center frequency $f_o$ to a value midway between poles $f_1$ and $f_2$ when inductor 32 is adjusted by means of switch 34 to a value approximately midway in its range of adjustment. In this manner, a symmetrical distribution of the different center frequencies available upon manipulation of switch 34 is achieved enabling best advantage to be taken of the total available range of adjustment.

In actuality, FIG. 3 depicts the reactance characteristic which would be observed upon measurement at the place in the circuit occupied by blocking capacitor 30. This is, at capacitor 30 a series-resonant condition exists at $f_o$. Since oscillator 10, however, requires a parallel-resonant condition for its mode of operation, the lead from the collector of transistor 11 is connected to the junction between capacitor 29 and inductor 32. As seen by oscillator 10, capacitor 29 and inductor 32 constitute a parallel combination, and a parallel-resonant condition exists across that combination at center frequency $f_o$.

Figure 4:
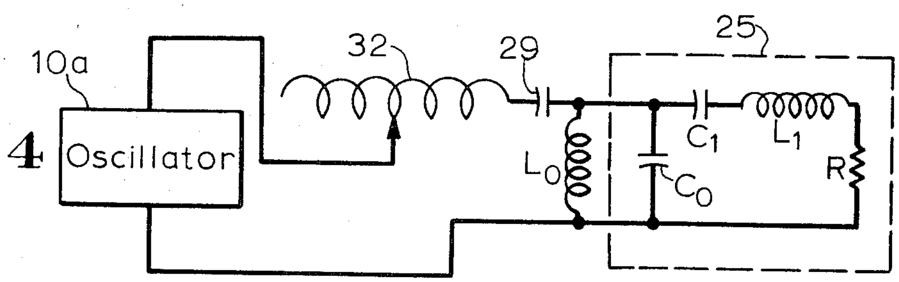
FIG. 4 is an equivalent circuit of an alternative embodiment of the acoustic wave transmitter.

Most conventional oscillators require a parallel resonant connection as in FIGS. 1 and 2. When, however, an oscillator is used which responds to a series-resonant condition of its frequency-determining element, the connections need only to be rearranged slightly as indicated by the alternative equivalent circuit of FIG. 4. In this case, capacitor 29 and inductor 32 are connected in a series between one side of an oscillator 10*a* and one side of inductor $L_o$ which, in turn, is connected to one of the transducer terminals. Thus, oscillator 10*a* is presented directly with the reactance characteristic of FIG. 3. Stated another way, the rearrangement amounts to no more than changing the circuit of FIG. 2 so that the oscillator is connected in the place of blocking capacitor 30.

Whichever mode of oscillator response is employed, it is to be observed from FIG. 3 that additional reactance zeros are present as a result of the inclusion of capacitor 29 and inductor 32. One such zero is at a frequency $f_a$ below $f_1$, and the other is at a frequency $f_b$ above pole $f_2$. Consequently, oscillator 10 (or 10*a*) is capable of generating spurious signals at either of the frequencies of those two additional reactance zeros. In order to suppress the generation of spurious signals a portion of the signal energy present in transducer 25 preferably is inversely fed back to the oscillator. As illustrated in FIG. 1, the desired feedback voltage is obtained from isolated electrode 36 and fed to the base of transistor 11. The feedback voltage at the spurious frequency $f_a$ or $f_b$ automatically is of inverse phase, with the voltage being in phase for oscillation at the desired center frequency.

A system has thus been described in which the high Q mechanically resonant frequency of a simple resonant piezoelectric transducer is electrically tuned in discrete steps. The system generates the modified resonant frequency ina self-excited oscillator and radiates acoustic waves at the modified frequency. The resulting multi-frequency acoustic transmitter requires no buffer stage, it is highly efficient and its frequency stability is essentially that of the piezoelectric resonator. Moreover, a wide range of flexibility is afforded. The paricular oscillator detailed in FIG. 1 is but one of many that may be employed. The only requirement on the oscillator selected is that it be capable of control over the desired acoustic frequency range by a piezoelectric resonant transducer. Its paricular form is otherise of no concern to the attainment of the overall objectives.

The system ilustrated in the drawings may be viewed as comprising an oscillator having an auxiliary compensating or correcting circuit which includes the isolated electrode 36 for suppressing the generation of spurious signals at frequencies outside the pole frequencies $f_1$ and $f_2$. The principles of this invention however are broad and encompass other implementations. For example, an alternative system may be employed wherein the feedback line from the voltage divider comprising resistors 17 and 18 back to the base of transistor 11 may be eliminated to create a system quite different from the FIG. 1 system. In this alternative system a feedback circuit contains a four terminal frequency-determining network having an input port at electrode 28 and an output port at electrode 36. By this arrangement, the isolated electrode comprises part of the frequency determining network and assures against oscillation at frequencies outside pole frequencies $f_1$ and $f_2$. The circuit including the isolated electrode 36 causes the phase-versus-frequency characteristic of the feedback circuit to be such that the capability of the system to oscillate a frequencies outside the pole frequencies $f_1$ and $f_2$ is suppressed.

Similarly, the particular shape and form of transducer 25 usually will be a matter of the acoustic wave propagating requirements. As stated, it is desirable that transducer 25 have a high electromechanical coupling coefficient and that it exhibit mechanical resonance over the range of desired control frequencies. In practical construction, the entire assembly of oscillator 10 and transducer 25, together with the switches and interconnecting components, as well as a battery, are housed within a casing of a size to be held in the hand of the user.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

I claim:

1. For use in the remote control of electrical apparatus, an acoustic signal generating system for generating a plurality of individually selectable, frequency-spaced sound signals, comprising:
- an electronic amplifier;
- feedback circuit means for providing positive feedback from a first port to a second port of said amplifier so as to cause said amplifier to be capable of oscillation; and
- means for determining the frequency of oscillation of the system and for generating spatial acoustic waves at the frequency of oscillation, including a piezoelectric transducer means coupled to said amplifier so as to affect the frequency of oscillation thereof, said piezoelectric transducer means having a high electro-mechanical coupling coefficient and coupled thereto selectively adjustable electrical reactance means for modifying the resonant frequency of said transducer means so as to cause the system to oscillate at a selected frequency.

2. The system defined by claim 1 wherein said reactance means has a reactance-versus-frequency characteristic which enables said system to be tuned to selected frequencies within a predetermined range of frequencies, said system including means for suppressing the capability of said system to oscillate at spurious frequencies outside said range, comprising isolated pick-up electrode means disposed on a portion of one vibratory surface of said transducer means for deriving a control signal which is of a phase effective to sustain oscillation at frequencies within said range, but of a phase which tends to suppress oscillation for frequencies outside said range.

3. An acoustic signal generating a system comprising:
- an electronic oscillator for developing a signal of a predetermined frequency;
- a piezoelectric transducer coupled to said oscillator so as to affect the frequency of oscillation thereof, said transducer exhibiting a substantial electro-mechanical coupling coefficient for controlling said frequency and for producing spatial acoustic waves; and
- selectively adjustable reactance means coupled across said transducer for modifying in discrete steps the resonant frequency of said transducer to cause said oscillator to oscillate at a selected signal frequency.

4. A system as defined in claim 3 in which said reactance means is composed of a pair of reactive elements of opposite sign and one of which has a magnitude adjustable in discrete steps.

5. A system as defined in claim 4 in which said predetermined frequency lies within a range of frequencies around a center frequency and in which the other of said reactive elements has a magnitude at least approximately of a value to neutralize the mid-range magnitude of said one element at said center frequency.

6. A system as defined in claim 3 in which said adjustable reactance means includes the series combination of an inductor and a capacitor.

7. A system as defined in cliam 6 in which said inductor is adjustable in discrete steps and, for a value of said inductor approximately midway in its range of adjustment, said capacitor has a value establishing said given frequency approximately midway in said range of frequencies.

8. A system as defined in claim 6 in which said oscillator responds in frequency change to an adjustment in frequency of series resonance of said transducer;
- in which an inductance is coupled across said transducer for establishing therewith a reactance characteristic having a zero-value center frequency between a pair of pole frequencies;
- and the series-combination of said inductor and said capacitor are coupled in series between one side of said inductance and said oscillator.

9. A system as defined in claim 3 in which an inductance is coupled across said transducer for establishing therewith a reactance characteristic having a zero-value center frequency between a pair of pole frequencies;
- and which further includes means for suppressing the generation of a pair of spurious signals capable of being developed by said oscillator which individually have frequencies respectively above and below the upper and lower ones of said pole frequencies.

10. A system as defined in claim 9 in which said means for suppressing the generation of said spurious signals includes feedback means for feeding back to said oscillator a portion of the signal energy present in said transducer which is in phase with said oscillator for frequencies between said pole frequencies and out of phase for frequencies outside said pole frequencies.

11. A system as defined in claim 10 in which said feedback means includes an isolated electrode disposed on a portion of one vibratory surface of said transducer for sensing said signal energy and for feeding back a portion thereof to said oscillator.

12. A system as defined in claim 3 which further includes inverse-feedback means for suppressing a pair of spurious signals capable of being developed by said oscillator at frequencies respectively below and above said range.

13. For use in the remote control of electrical apparatus, an acoustic signal generating system for generating a plurality of individually selectable, frequency-spaced sound signals, comprising:
- an electronic amplifier; and
- feedback circuit means for providing positive feedback to cause said amplifier to be capable of oscillation, said feedback circuit means including a piezoelectric transducer having a high electro-mechanical coupling coefficient and coupled thereto selectively adjustable electrical reactance means for modifying the resonant frequency of said transducer so as to cause the system to oscillate at a selected frequency, said piezoelectric transducer radiating spatial acoustic waves at said frequency of oscillation.

14. For use in the remote control of electrical apparatus, an acoustic signal generating system for generating a plurality of individually selectable, frequency-spaced sound signals, comprising:

an electronic amplifier; and feedback circuit means for providing positive feedback from a first port to a second port of said amplifier so as to cause said amplifier to be capable of oscillation, said feedback circuit means comprising:

a piezoelectric transducer having a high electromechanical coupling coefficient and being capable of radiating spatial acoustic waves at its frequency of oscillation, selectively adjustable reactance means coupled to said transducer for modifying the resonant frequency of said transducer so as to cause the system to oscillate at a selected frequency, said reactance means having a reactance-versus-frequency characteristic which enables said system to be tuned to selected frequencies within a predetermined range of frequencies, and means for suppressing the capability of said system to oscillate at spurious frequencies outside said range, including isolated pick-up electrode means disposed on a portion of one vibratory surface of said transducer for deriving a control signal for application to said amplifier which is of phase to sustain oscillation for frequencies within said range, but of phase to suppress oscillation for frequencies outside said range

* * * * *